E. STILES.
Car Truck.

No. 57,404.  Patented Aug. 21, 1866.

Witnesses:
Edward H Hyde
J. B. Fuller

Inventor:
Ezra Stiles

UNITED STATES PATENT OFFICE.

EZRA STILES, OF SPRINGFIELD, MASSACHUSETTS, ASSIGNOR TO HIMSELF, J. R. MAURICE, AND W. F. GOODWIN.

IMPROVED SAFETY-CAR TRUCK.

Specification forming part of Letters Patent No. 57,404, dated August 21, 1866.

*To all whom it may concern:*

Be it known that I, EZRA STILES, of Springfield, Hampden county, Commonwealth of Massachusetts, have invented a new and Improved Safety-Car Truck; and I do hereby declare that the following is a full and exact description thereof, reference being had to the accompanying drawings, and to the letters of reference marked thereon.

Figure 1:
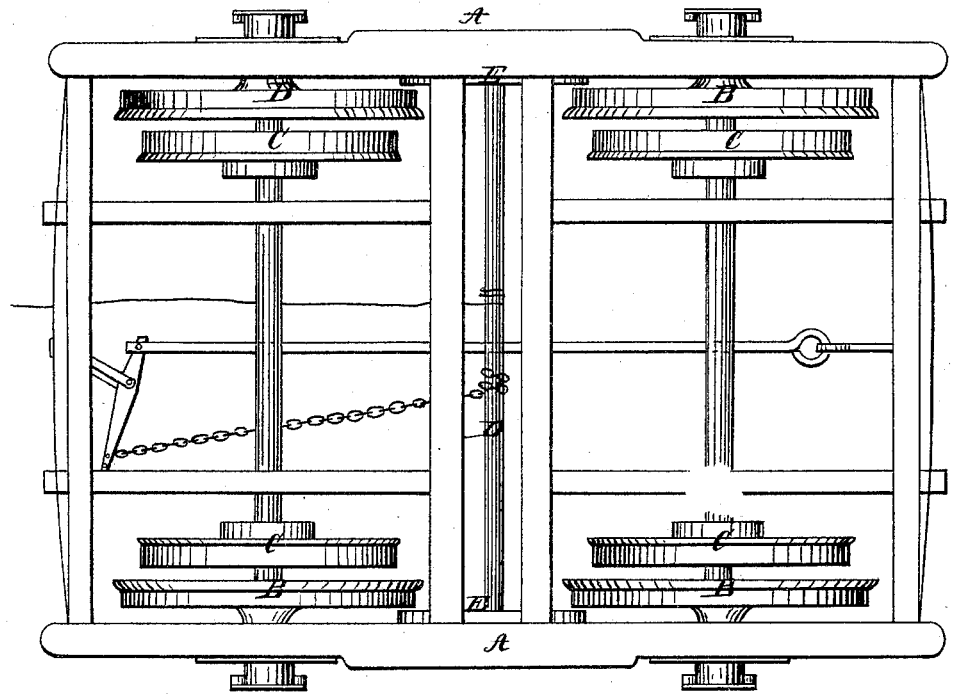
Figure 2:
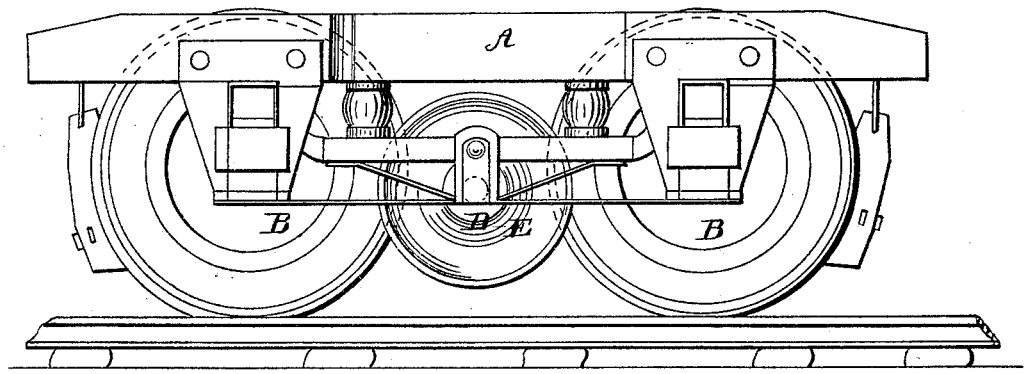

In the drawings, Figure 1 is a plan, and Fig. 2 a side view, of my invention.

This invention consists in so arranging the truck that should it accidentally be thrown to either side, so that the ordinary wheels leave the track, it shall still be supported and be able to run without injury, and at the same time warning is given the engineer, and the brakes of this truck are applied, as I will now more fully describe.

The construction of this invention I will now describe.

A is the frame-work, and B B B B the wheels, of the ordinary truck. Inside of each of these wheels B B, &c., I place another wheel, C C, &c., of slightly less diameter than the outside wheels, and between the ordinary axles in the middle of the truck, at D, I place another axle having the small wheels E E on each end so arranged that the bottoms of these wheels are on a plane with the bottoms of the wheels C C C C, and horizontally they are placed as far outside of the ordinary wheels B B, &c., as the wheels C C, &c., are inside.

To the central axle, D, I attach the end of a chain or cord attached to the end of the brake-lever G, so that it may be wound up by the revolution of this axle; and I also attach to this same axle a cord which runs to the whistle of the locomotive.

The operation of this invention, in case the ordinary wheels are thrown from the track in either direction laterally, is to throw the truck onto the safety-wheels C C on one side and one of the smaller wheels E on the other, so that it is still able to keep the track; but as soon as this is done the revolution of the central axle, D, winds up the brake-chain H, and also the whistle-cord L, thus causing the stoppage of the train and giving warning of danger to the engineer.

With this truck, it will be seen that it is impossible for the train to get off the track in such a manner as to do any damage, thus rendering railway-trains perfectly safe from accidents of this kind.

Now, having described my invention, what I claim as new, and desire to secure by Letters Patent, is—

In combination with an ordinary car-truck, the inside wheels C C C C and the central axle, D, and wheels E E, when arranged and operating substantially in the manner and for the purpose herein set forth.

EZRA STILES.

Witnesses:
EDWARD H. HYDE,
J. B. FULLER.